United States Patent
Tagami et al.

(10) Patent No.: US 7,962,852 B2
(45) Date of Patent: Jun. 14, 2011

(54) INFORMATION PROCESSING APPARATUS, INFORMATION PROCESSING METHOD, AND RECORDING MEDIUM

(75) Inventors: Naoki Tagami, Tokyo (JP); Teruhisa Kamachi, Tokyo (JP); Taketo Naito, Tokyo (JP)

(73) Assignee: Sony corporation, Tokyo (JP)

( * ) Notice: Subject to any disclaimer, the term of this patent is extended or adjusted under 35 U.S.C. 154(b) by 1020 days.

(21) Appl. No.: 10/016,566

(22) Filed: Oct. 30, 2001

(65) Prior Publication Data
US 2002/0080173 A1 Jun. 27, 2002

(30) Foreign Application Priority Data
Oct. 31, 2000 (JP) ................................ P2000-332924

(51) Int. Cl.
*G06F 3/00* (2006.01)
(52) U.S. Cl. ........ 715/733; 715/751; 715/753; 715/757; 715/758; 715/848
(58) Field of Classification Search ................ 715/733, 715/751, 753, 757–759, 848
See application file for complete search history.

(56) References Cited

U.S. PATENT DOCUMENTS

| | | | | |
|---|---|---|---|---|
| 5,880,731 A | * | 3/1999 | Liles et al. ................... | 345/758 |
| 6,020,884 A | * | 2/2000 | MacNaughton et al. ..... | 345/747 |
| 6,057,856 A | * | 5/2000 | Miyashita et al. ........... | 345/633 |
| 6,148,328 A | * | 11/2000 | Cuomo et al. ................ | 709/204 |
| 6,212,548 B1 | * | 4/2001 | DeSimone et al. ........... | 709/204 |
| 6,281,898 B1 | * | 8/2001 | Nikolovska et al. ......... | 715/848 |
| 6,442,590 B1 | * | 8/2002 | Inala et al. ................... | 709/204 |
| 6,446,112 B1 | * | 9/2002 | Bunney et al. ................ | 709/204 |
| 6,487,583 B1 | * | 11/2002 | Harvey et al. ................ | 709/204 |
| 6,496,851 B1 | * | 12/2002 | Morris et al. ................. | 709/204 |
| 6,681,108 B1 | * | 1/2004 | Terry et al. ................ | 455/412.2 |
| 6,697,840 B1 | * | 2/2004 | Godefroid et al. ........... | 709/205 |
| 6,708,172 B1 | * | 3/2004 | Wong et al. .................... | 707/10 |
| 6,732,148 B1 | * | 5/2004 | Estrada et al. ............... | 709/205 |
| 6,750,881 B1 | * | 6/2004 | Appelman .................... | 345/733 |
| 6,757,365 B1 | * | 6/2004 | Bogard ....................... | 379/88.17 |
| 6,772,195 B1 | * | 8/2004 | Hatlelid et al. ............... | 709/204 |

OTHER PUBLICATIONS

Steinberg, Gene. "Sams Teach Yourself America Online in 10 Minutes". Sams Publishing, 1998. pp. 21, 90-92, 99-101.*
"mIRC Version History". http://www.mirc.co.uk/versions.txt. 1995. pp. 1-5.*

* cited by examiner

*Primary Examiner* — Michael Roswell
(74) *Attorney, Agent, or Firm* — K&L Gates LLP

(57) ABSTRACT

An information processing apparatus restricts admission to space occupied by a user in a virtual space. When a second user of a second terminal makes a request for admission to space which is in the virtual space and which is occupied by a first user of a first terminal, a space management server transmits data to the first user causing the first user to recognize that the request for admission is made by the second user. In response to an action based on the data, the first user performs an operation. If the first user performs an operation to permit the second user admission to the space, the second user can enter the space occupied by the first user.

14 Claims, 12 Drawing Sheets

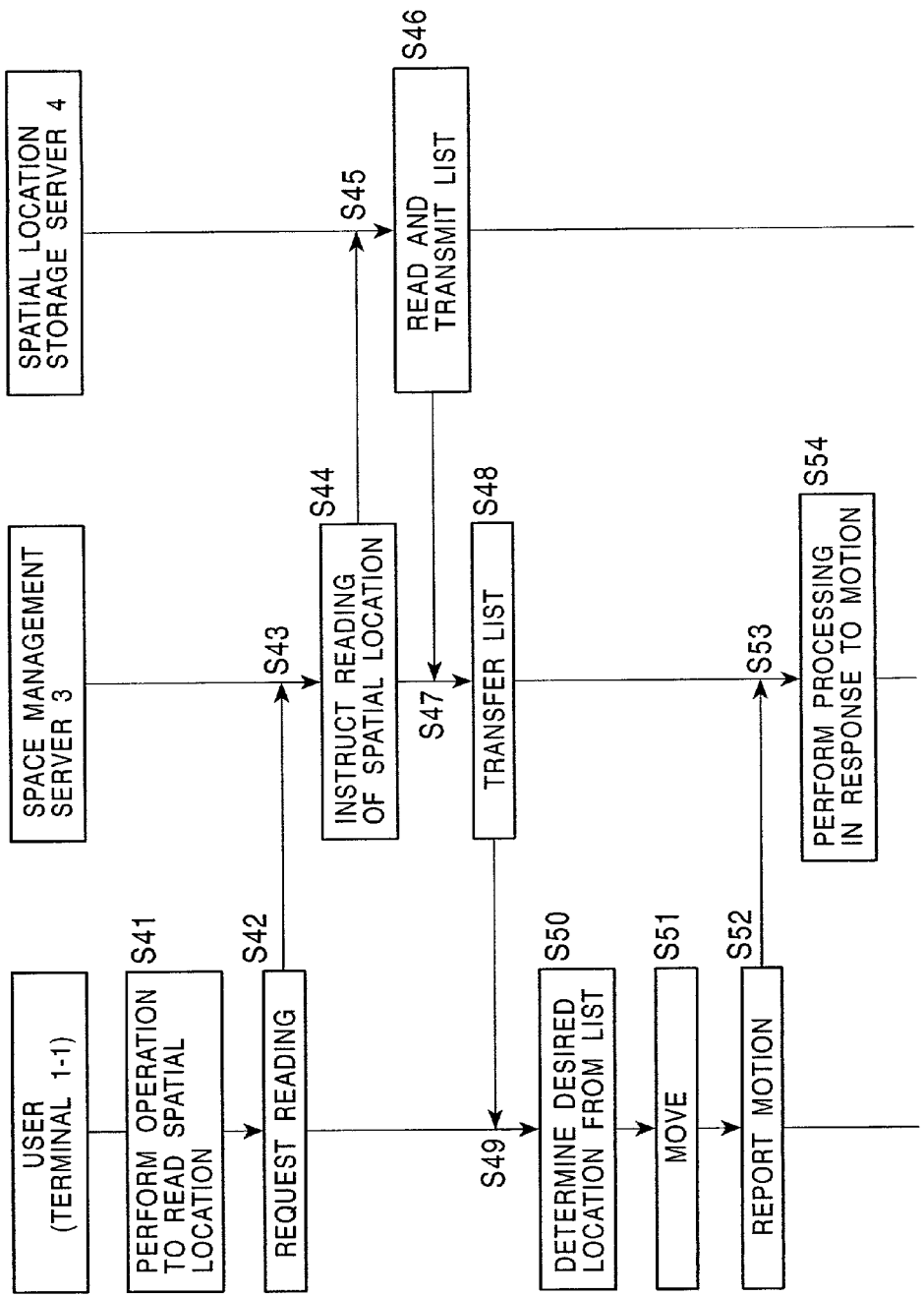

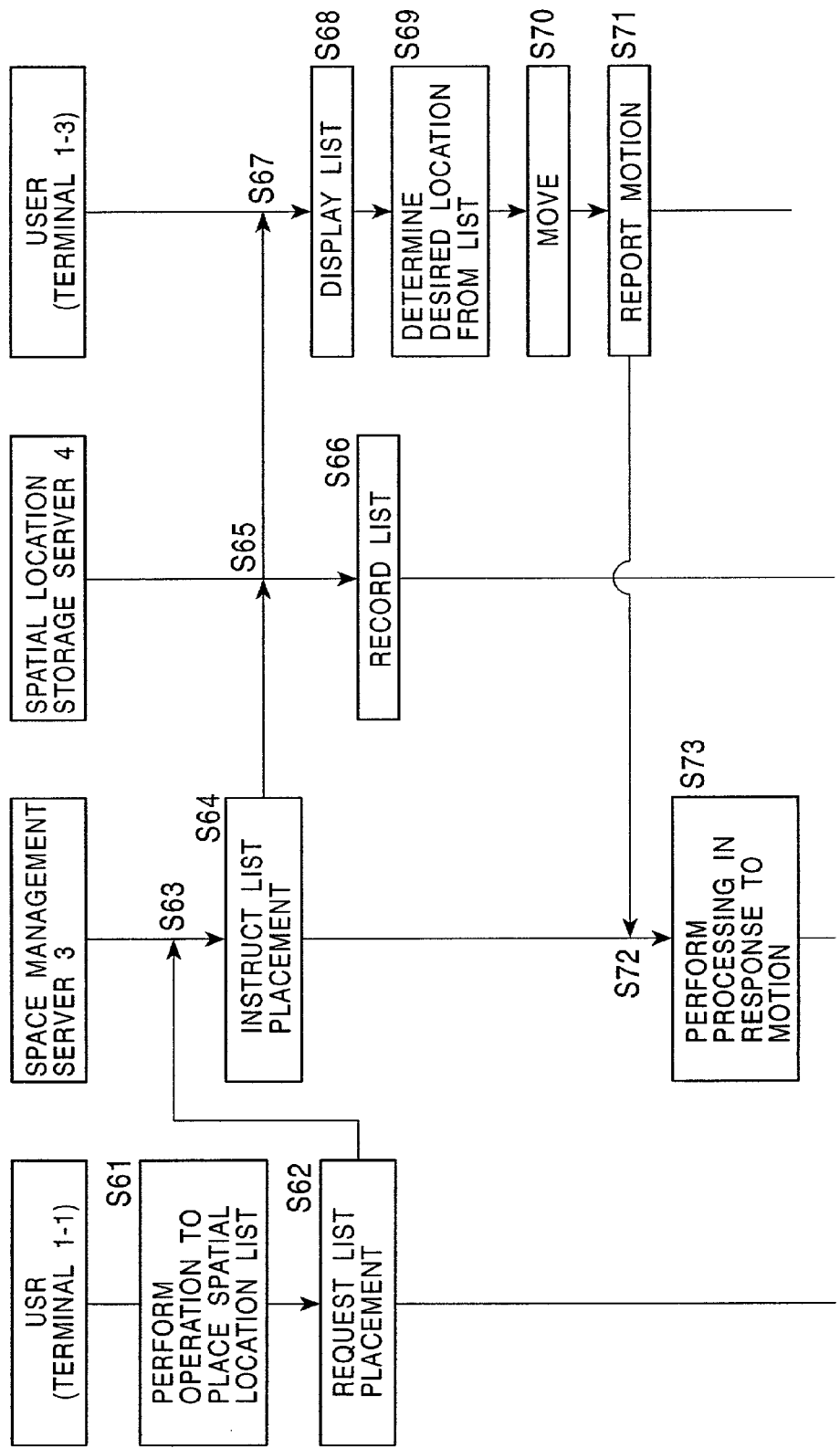

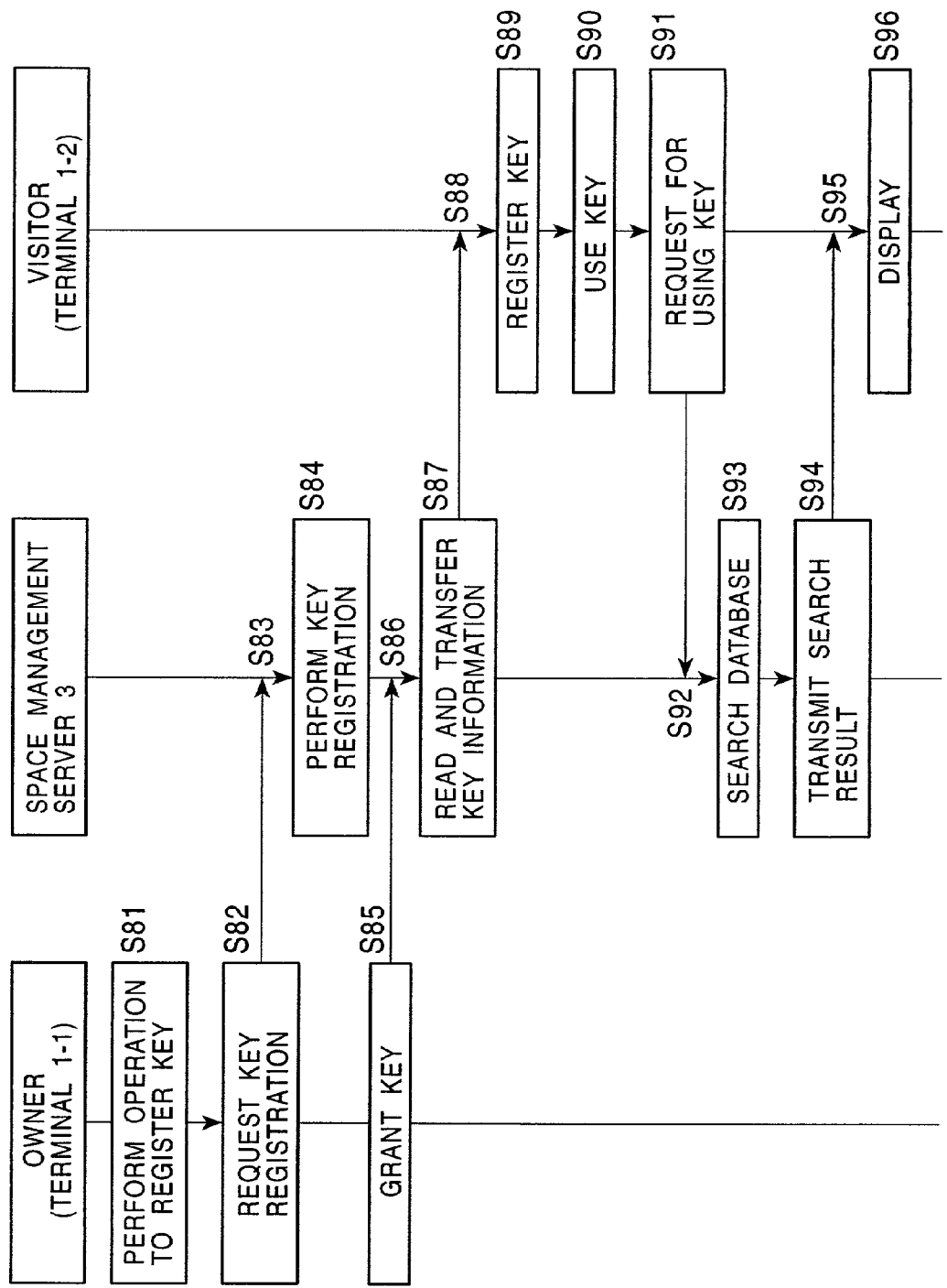

INFORMATION PROCESSING APPARATUS, INFORMATION PROCESSING METHOD, AND RECORDING MEDIUM

BACKGROUND OF THE INVENTION

The present invention relates to apparatuses and methods for processing information and recording media therefore, and more particularly, the present invention relates to an apparatus and method for processing information and a recording medium therefor, which are suitably applicable to an apparatus which provides space owned or occupied by a user in a virtual reality world and which is used to perform various processes in the space.

The Internet has recently become widely used. One service referred to as chat has also become popular. The chat may take the form of a service displaying text data on computers of two users. Another example includes moving an "avatar"(i.e., a graphical representation of a user in virtual space) and enabling the user's avatar to chat (exchange text data) with other users (avatars) encountered in that virtual space or communicate with other users using certain behaviors.

Yet another example includes a service enabling a number of users to chat with one another at the same time. Various forms of services are provided.

A chat which enables users to chat with one another by moving the users' avatars in the virtual space is only performed in a common virtual space. In other words, the virtual space can only exist as space which is shared by users and in which the users chat with one another or communicate with one another using avatars' behaviors while detecting the positional relationships among the users in the space.

In the virtual space, space which is owned or managed by a user may be provided. In such a case, other users who have no ownership can freely enter the owned space. Some users behave in the owned space in an undesirable manner as judged by the user who owns the space. However, these undesirable users cannot be eliminated.

Also, a user can register a favorite place in virtual space. The registered place only belongs to that user and cannot be brought into other user's knowledge. In general, a user registers places with usable facilities and places with beautiful scenery in the virtual space. However, other users cannot be notified of information relating to such meaningful places.

SUMMARY OF THE INVENTION

An object of the present invention is, however, to provide a mechanism allowing a user to own space which cannot be entered by other users without obtaining permission given by the user who is the owner of that space and to provide a mechanism allowing a predetermined user to make a list of information, relating to the space, known to other users.

According to an embodiment of the present invention, an information processing apparatus for managing virtual space containing space occupied by a user is provided. The information processing apparatus includes a notifying unit for notifying, when a second user makes a request for admission to space occupied by a first user, the first user of the request. A control unit is provided for controlling admission of the second user to the space based on a response from the first user, the response being made as a result of the notification to the first user by the notifying unit.

The notifying unit may include an action which is visually or audibly recognizable by the first user.

The information processing apparatus may further include a storage unit for storing a list of users who are set by the first user as those denied admission to the space. A determining unit is provided for determining, when the second user makes the request for admission to the space, whether the second user is on the list stored in the storage unit. When the determining unit determines that the second user is on the list, the notification by the notifying unit may be terminated, and the control unit may deny the second user admission to the space.

The information processing apparatus may further include a storage unit for storing a list of users who are set by the first user as those admitted to the space; and a determining unit for determining, when the second user makes the request for admission to the space, whether the second user is on the list stored in the storage unit. When the determining unit determines that the second user is on the list, the notification by the notifying unit may be terminated, and the control unit may permit the second user admission to the space.

The information processing apparatus may further include a storage unit for storing information generated by the first user to enter the space. A distributing unit is provided for distributing, in response to an instruction from the first user, the information stored in the storage unit to the second user. A determining unit is provided for determining, when the second user uses the information distributed by the distributing unit to make a request for admission to the space, whether the information used by the second user matches the information stored in the storage unit. When the determining unit determines that the information used by the second user matches the information stored in the storage unit, the notification by the notifying unit may be terminated, and the control unit may permit the second user admission to the space.

The information processing apparatus may further include a storage unit for storing a list of predetermined spatial locations in the virtual space, the spatial locations being designated by the first user. A placing unit is provided for placing, in response to an instruction from the first user, the list stored in the storage unit in predetermined space in the virtual space.

According to another embodiment of the present invention, an information processing method is provided for an information processing apparatus for managing virtual space containing space occupied by a user. The information processing method includes the steps of notifying, when a second user makes a request for admission to space occupied by a first user, the first user of the request, and controlling admission of the second user to the space based on a response from the first user, the response being made as a result of the notification to the first user in the notifying step.

According to yet another embodiment of the present invention, there is provided a storage medium having stored therein a computer-readable program for causing a computer system to perform processing which enables a plurality of users to communicate with one another in a shared virtual space formed and provided on a computer network. The program includes the steps of notifying, when a second user makes a request for admission to space occupied by a first user, the first user of the request, and controlling admission of the second user to the space based on the result of the notification to the first user in the notifying step.

According to another embodiment of the present invention, there is provided a program for causing a computer to perform the steps of notifying, when a second user makes a request for admission to virtual space occupied by a first user, the first user of the request, and controlling admission of the second user to the virtual space based on the result of the notification to the first user in the notifying step.

The program may cause the computer to perform the further steps of storing a list of users who are set by the first user as those denied admission to the virtual space, determining, when the second user makes the request for admission to the virtual space, whether the second user is on the list, and terminating, when it is determined that the second user is on the list, the notification and denying the second user admission to the virtual space.

The program may cause the computer to perform the further steps of storing a list of users set by the first user as those permitted admission to the virtual space, determining, when the second user makes the request for admission to the virtual space, whether the second user is on the list, and terminating, when it is determined that the second user is on the list, the notification and permitting the second user admission to the virtual space.

The program may cause the computer to perform the further steps of storing information generated by the first user to enter the virtual space, distributing, in response to an instruction from the first user, the stored information to the second user, determining, when the second user uses the distributed information to make a request for admission to the virtual space, whether the information used by the second user matches the stored information, and terminating, when it is determined in the determining step that the information used by the second user matches the stored information, the notification and permitting the second user admission to the virtual space.

The program may cause the computer to perform the further steps of storing a list of predetermined spatial locations in the virtual space, the spatial locations being designated by the first user, and placing, in response to an instruction from the first user, the stored list in predetermined space in the virtual space.

According to an embodiment of the present invention, when a second user makes a request for admission to space occupied by a first user, the first user is notified of the admission request. Based on a response from the first user, admission of the second user to the space is controlled. Thus, admission control to the space occupied by the user can be performed in a more strict manner.

Additional features and advantages of the present invention are described in, and will be apparent from, the following Detailed Description of the Invention and the Figures.

BRIEF DESCRIPTION OF THE FIGURES

FIG. 10 is a flowchart of the operation of the system shown in FIG. 1 when a list is created.

FIG. 11 is a flowchart of the operation of the system shown in FIG. 1 when a list is placed.

FIG. 12 is a flowchart of the operation of the system shown in FIG. 1 with regard to a key.

DETAILED DESCRIPTION OF THE INVENTION

Figure 1:
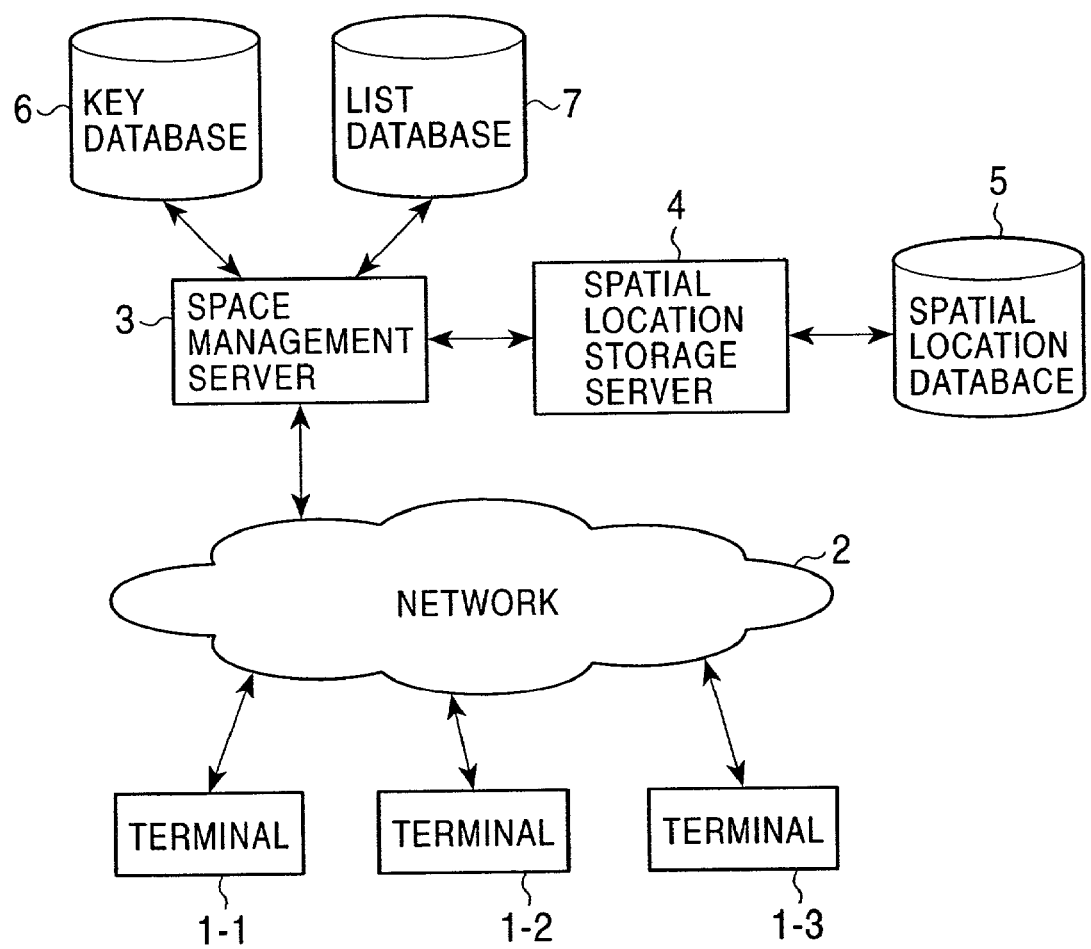
FIG. 1 is a diagram showing a system according to an embodiment of the present invention.

FIG. 1 shows the configuration of a system according to an embodiment of the present invention. Terminals 1-1 to 1-3 are terminals at user sides. The terminals 1-1 to 1-3 (hereinafter simply referred to as a "terminal 1" if it is unnecessary to distinguish among the terminals 1-1 to 1-3) are connected to a network 2, for example, the Internet. The terminal 1 may take the form of a personal computer, a cellular phone or the line. Although only the terminals 1-1 to 1-3 are shown in FIG. 1 to simplify the description, a number of terminals are actually connected to the network 2.

Preferably, a space management server 3 is also connected to the network 2 and is provided to manage virtual space provided for the terminal 1. For example, the space management server 3 detects the positional relationships among an avatar of a user displayed on the terminal 1 (hereinafter a representation that moves through virtual space as a user's incarnation is referred to as an avatar) and avatars of other users and transmits data to each terminal 1 through the network 2 so as to display images based on the positional relationships.

Preferably, a spatial location storage server 4 is connected to the space management server 3. The spatial location storage server 4 manages spatial information which is registered by the user and which is stored in a spatial location database 5. A key database 6 which stores keys (described below) and a list database 7 which stores lists may also be connected to the space management server 3.

Although the space management server 3 and the spatial location storage server 4 will be described as separate servers in the following description, the two servers can be formed of a single server.

Figure 2:
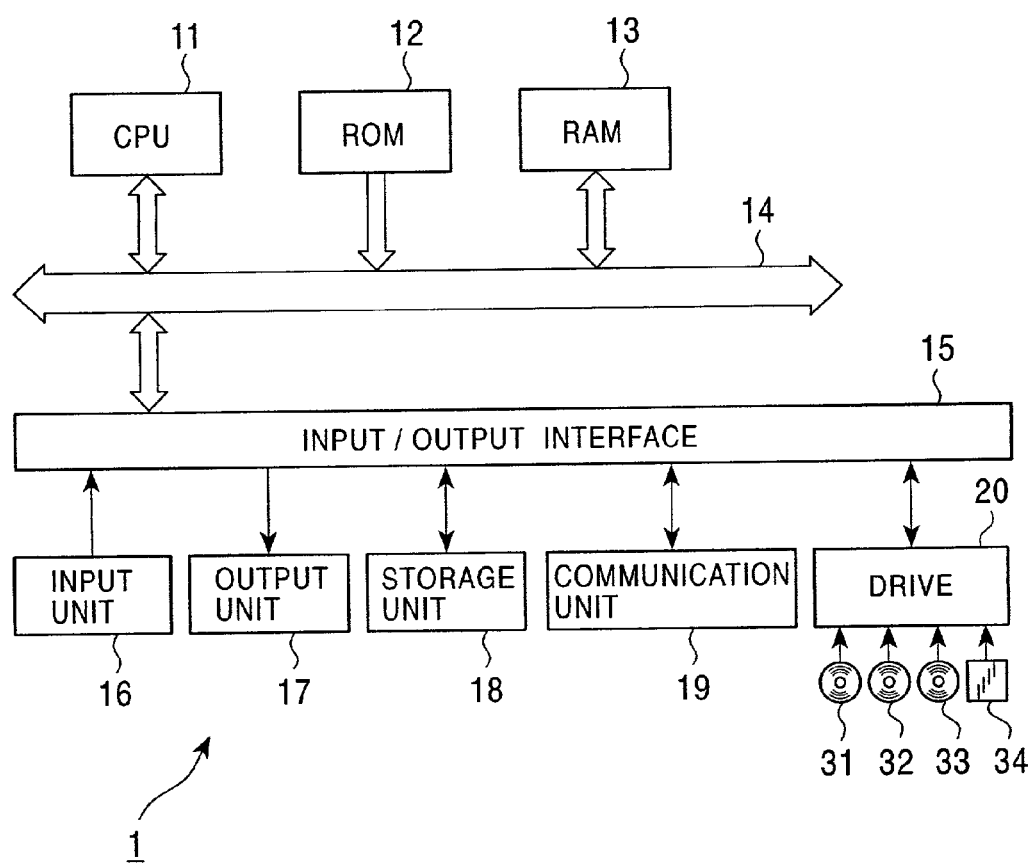
FIG. 2 is a diagram showing the internal structure of a terminal according to an embodiment of the present invention.

FIG. 2 shows the internal structure of the terminal 1. A CPU (Central Processing Unit) 1 of the terminal 1 executes various processes in accordance with a program stored in a ROM (Read Only Memory) 12. A RAM (Random Access Memory) 13 appropriately stores data and a program for the CPU 11 to perform various processes. An input unit 16 containing a keyboard, a mouse, and the line is connected to an input/output interface 15. Signals input to the input unit 16 are output to the CPU 11. Also an output unit 17 containing a display, a loudspeaker, and the line is connected to the input/output interface 15.

Furthermore, a storage unit 18 such as a hard disk and a communication unit 19 which exchanges data with the space management server 3 over the network 2 are connected to the input/output interface 15. A drive 20 is used when reading data from or writing data to a recording medium such as a magnetic disk 31, an optical disk 32, a magneto-optical disk 33, or a semiconductor memory 34, or the line.

Since the space management server 3 and the spatial location storage server 4 have basically the same structure as the terminal 1, the structure thereof is not illustrated.

Figure 3:
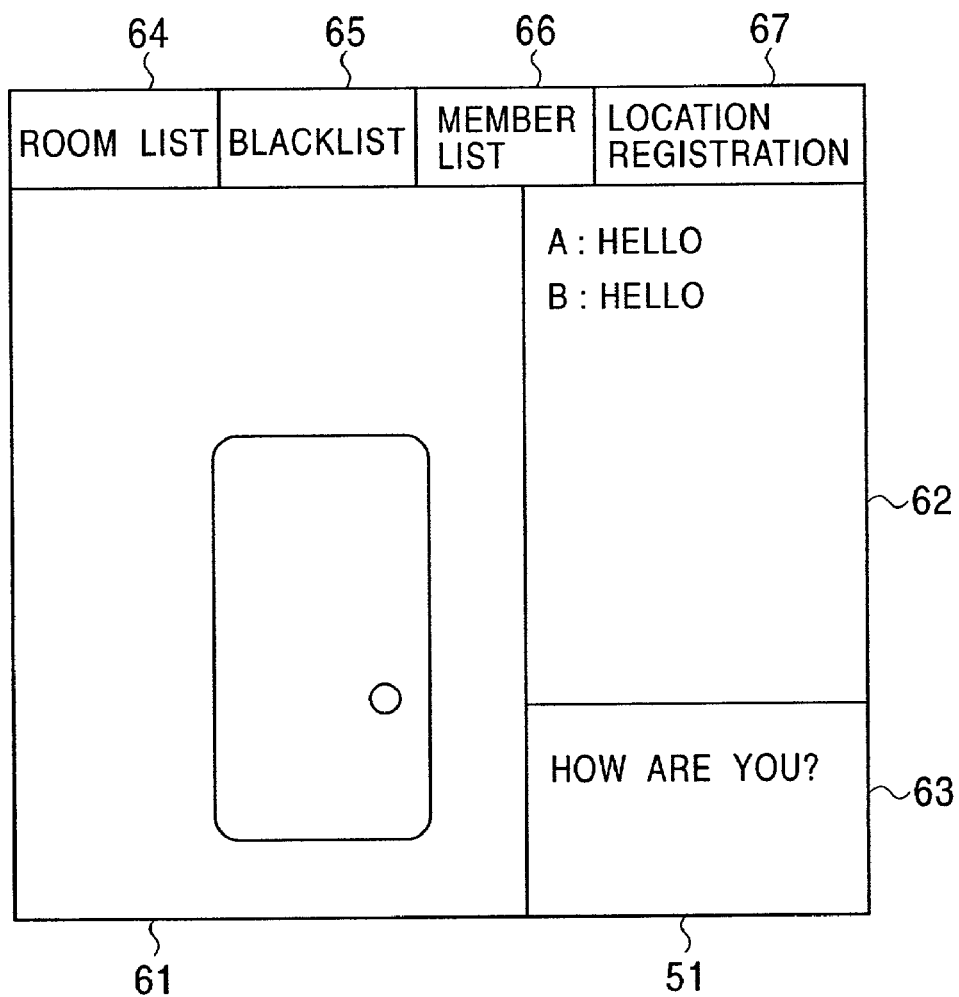
FIG. 3 illustrates an example of a screen displayed on a display of a terminal according to an embodiment of the present invention.

Referring to FIG. 3, a screen displayed on a display included in the output unit 17 of the terminal 1 is described. In an example shown in FIG. 3, operation buttons for moving the avatar are omitted. The screen is not limited to the example shown in FIG. 3.

In general, a display 51 included in the output unit 17 includes an image display section 61 displaying the user's avatar and other user's avatars and scenery in the virtual space; a chat display section 62 displaying contents of a chat with other avatars; and a text input section 63 in which chat text is input by the user.

On the upper side of the display 51, a room list button 64, a blacklist button 65, a member list button 66, and a location registration button 67 are provided. In an embodiment, the virtual space contains rooms owned by users (space which can be occupied by users). The room list button 64 is pressed to move the user from the user's room owned by the user to a room owned by another user.

The blacklist button 65 is pressed to register a user who is unwelcome to enter the user's room or to refer to or edit the list registered by the user. Unlike the blacklist button 65, the member list button 66 is pressed to register a user who is admitted to the user's room at any time (without obtaining permission described below) or to refer to or edit the list registered by the user.

The location registration button 67 is pressed to register a user's favorite location (which in this case is a room) in the virtual space or to refer to or edit the list registered by the user.

Figure 4:
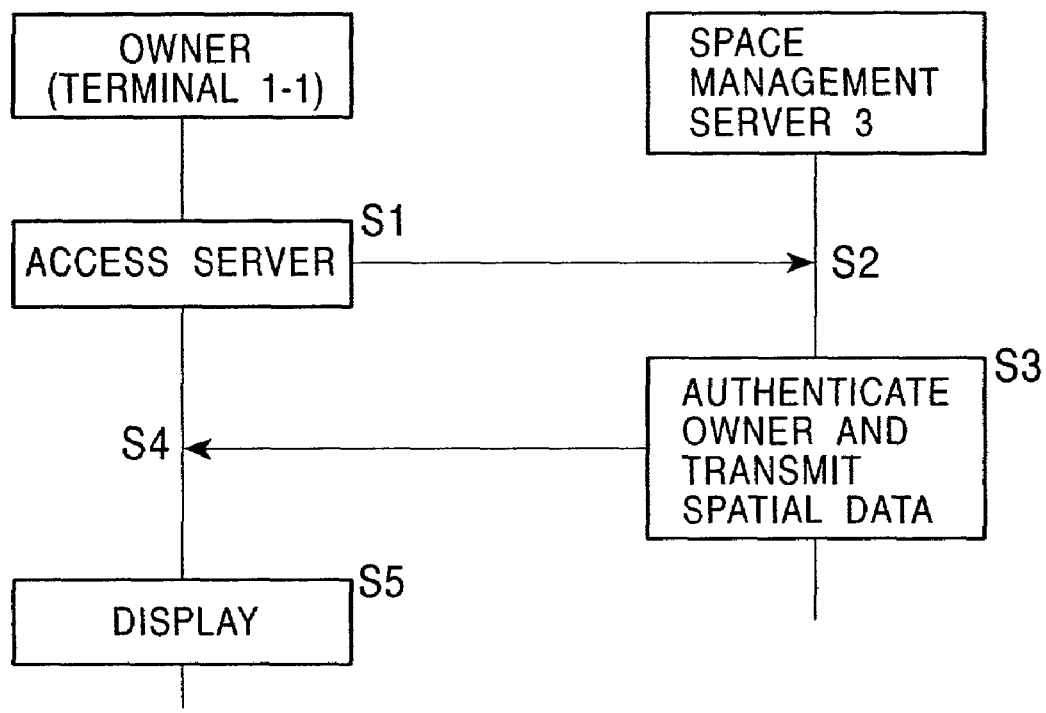
FIG. 4 is a flowchart of the operation of the system shown in FIG. 1 when a user enters a virtual space.

FIG. 4 is a flowchart of the operation of the system shown in FIG. 1 when a user of the terminal 1-1 enters the virtual space. Hereinafter the user (avatar) of the terminal 1-1 is referred to as an owner if necessary. In step S1, the owner accesses the space management server 3 through the network 2.

In step S2, the space management server 3 receives an access request from the owner (terminal 1-1). In step S3, the space management server 3 authenticates the owner and transmits spatial data. Specifically, the terminal 1-1 sends an access request to the space management server 3 by transmitting data (such as password data for admission to the virtual space) for authenticating the terminal 1-1. Based on the data, the space management server 3 authenticates the owner. The space management server 3 reads spatial data based on the authentication result and transmits the spatial data to the terminal 1-1 which has sent the access request.

The spatial data includes data concerning a room which is in the virtual space and which is given to the user of the terminal 1-1. If the user of the terminal 1-1 gains access to the room, the room owned by the user and an avatar of the user are displayed. Specifically, the spatial data transmitted from the space management server 3 is received in step S4 by the owner and displayed in step S5 on the display 51 included in the output unit 17 of the owner's terminal 1-1, as shown in FIG. 3.

Such an operation is performed by a user of the terminal 1-2, thus displaying a screen as shown in FIG. 3 on the display 51 included in the output unit 17 of the terminal 1-2. Referring to a flowchart in FIG. 5, a case in which the user (avatar) of the terminal 1-2 visits a room owned by another user (which in this case is the user of the terminal 1-1) will now be described. If necessary, the user (avatar) of the terminal 1-2 is referred to as a visitor.

Figure 6:
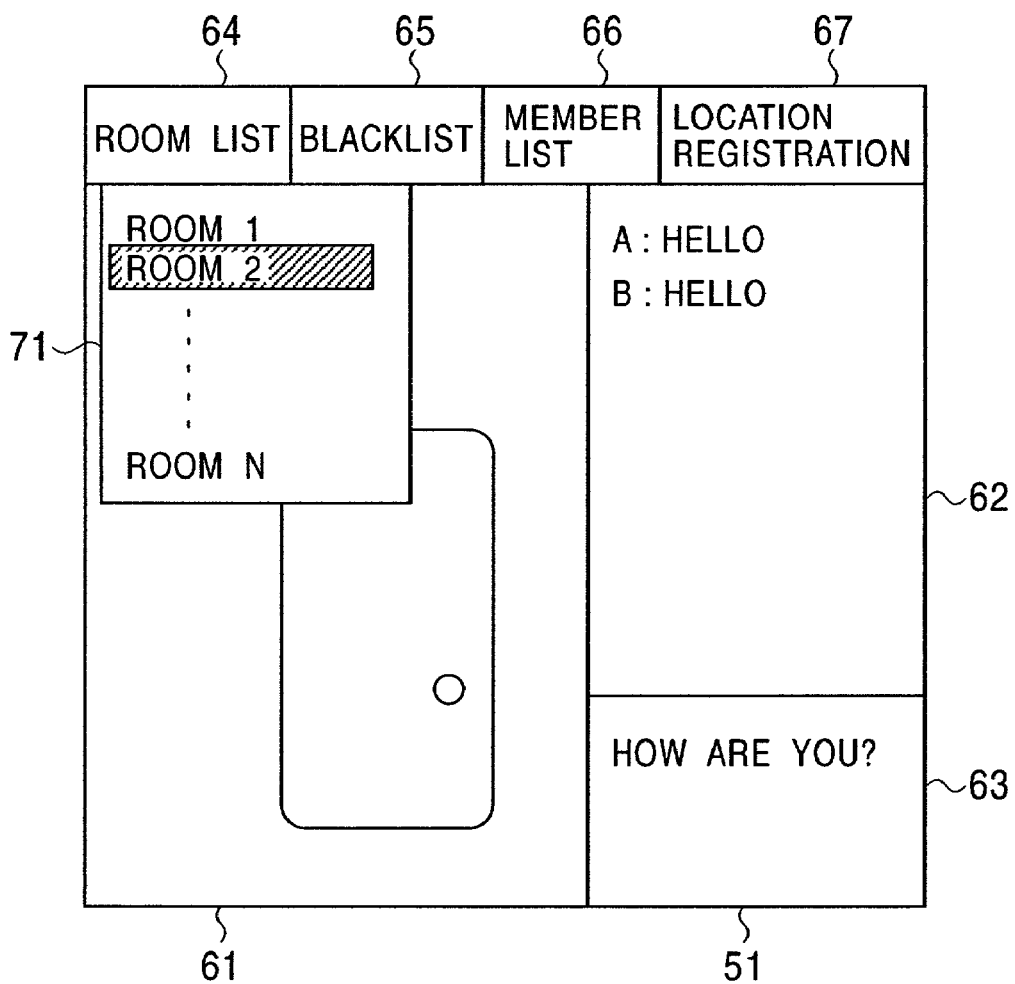
FIG. 6 illustrates another example of a screen displayed on the display.

In step S11, the visitor determines a destination. When determining a destination, the visitor presses the room list button 64 on the screen shown in FIG. 3 using the mouse (not shown). In response, as shown in FIG. 6, a room list 71 is displayed on the display 51.

The room list 71 displays all rooms existing in the virtual space. If the owner of a particular room is absent, that particular room is displayed so as to be distinguishable from rooms whose owners are present. Alternatively, among rooms existing in the virtual space, only rooms whose owners are present are displayed. A room is indicated by a nickname for that room.

The visitor selects a desired room from the displayed room list 71 and confirms the selected room. Data on the confirmed destination and data for authenticating the visitor are transmitted to the space management server 3. In step S12, the space management server 3 receives the data transmitted from the visitor's terminal 1-2. In step S13, the space management server 3 searches a blacklist registered by the owner of a room confirmed as the destination.

The blacklist is a list of unwelcome visitors registered by the owner. The blacklist is created by pressing the blacklist button 65 shown in FIG. 3. When the visitor makes a visit, a nickname or ID of the visitor is displayed on the owner's display so that the owner can recognize who the visitor is.

When the owner wants a certain visitor who has made at least one visit not to enter the owner's room again, at a time when the unwanted visitor is about to enter or at a subsequent time, the owner refers to a log or the like and presses the blacklist button 65 to transmit the nickname or ID of that visitor to the space management server 3.

When a request is received indicating that the owner desires the unwanted visitor to be registered on the blacklist, the space management server 3 performs processing to register the requested visitor. Thus, the updated owner's blacklist is registered in the list database 7 of the space management server 3.

The blacklist is provided for each owner. For example, a visitor registered on blacklists of a plurality of owners (such as ten or more people) may be given a warning.

In step S13, the blacklist which is registered by the owner as described above is searched for the visitor. Using the search result, in step S14, it is determined whether the visitor is registered on the blacklist. If it is determined in step S14 that the visitor is not on the blacklist, it is determined in step S15 whether the visitor is registered on a member list.

The member list is a list which is the opposite of the blacklist (i.e., it contains visitors who are always welcome). The member list is also registered in the list database 7 of the space management server 3 by pressing the member list button 66 in a manner similar to processing the blacklist.

In the list database 7, the blacklist and the member list are recorded for each user. The blacklist and the member list can be edited (added, deleted, etc.) only by the corresponding user.

Using the result of searching the member list in step S15, it is determined in step S16 whether the visitor is registered on the member list. If it is determined that the visitor is not registered on the member list, data is transmitted to the owner (terminal 1-1) indicating that the visitor has visited the owner's room.

In step S17, the owner, that is, the terminal 1-1, receives the data from the space management server 3 indicating that the visitor has visited. In step S18, an action indicating that the visitor has come is performed based on the data. Specifically, a display screen flashes, chimes are sounded or some other action is performed causing the owner to visually and/or audibly recognize that the visitor has come.

In response to the action, the owner recognizes that the visitor has come. When the owner determines that the visitor has come, the owner determines in step S19 whether to ignore the visit. For example, the owner can ignore a new visitor when the owner is not in the mood for a new visitor since the owner has already been receiving a visit from another visitor and having a fin time chatting with that visitor.

Figure 7:
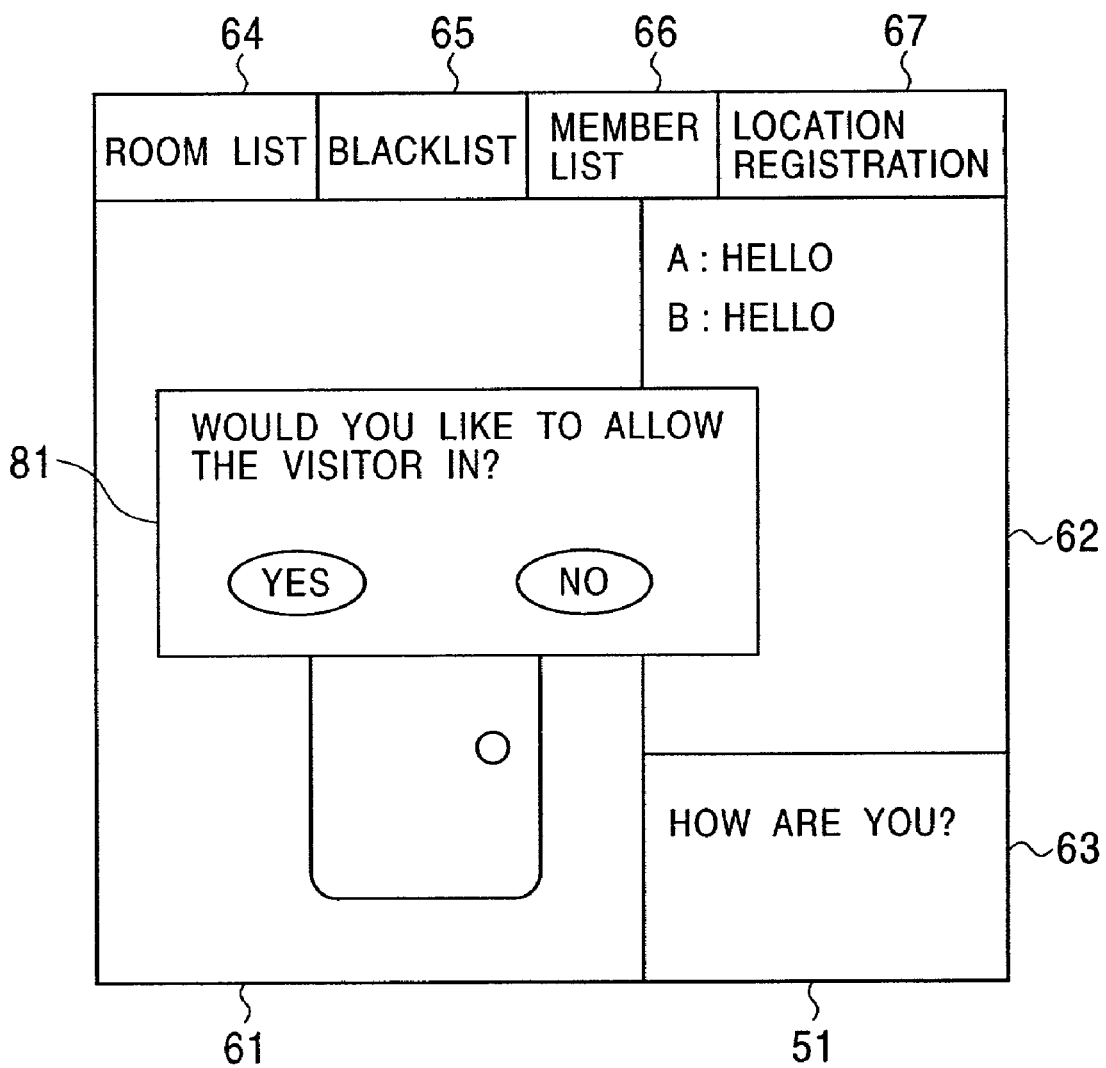
FIG. 7 illustrates another example of a screen displayed on the display.

If it is determined in step S19 that the owner will not ignore the new visitor, the owner performs predetermined processing to display a window 81 shown in FIG. 7 asking the owner whether to allow the visitor to enter the owner's room. For example, as shown in FIG. 7, the window 81 displays the message "Would you like to allow the visitor in?" together with a YES button to be pressed if admission is allowed and a NO button to be pressed if admission is denied.

Although FIG. 7 illustrates the message "Would you like to allow the visitor in?", actually the nickname or ID of the user of the terminal 1-2 is displayed in place of the word "visitor".

In step S21, the owner presses the YES button or the NO button on the displayed window 81. If the NO button is pressed, the operation proceeds to step S22. If the YES button is pressed, the operation proceeds to step S23. The operation proceeds to step S22 when it is determined in step S14 that the visitor is registered on the blacklist or when it is determined in step S19 that the new visitor is to be ignored.

In step S22, the space management server 3 transmits data instructing the visitor's terminal 1-2 to display the message indicating that the admission is denied. If the owner determines in step S19 not to ignore the visit from the visitor, the window 81 is displayed in step S20. Thus, it can be concluded that the owner has determined to ignore the visitor if the window 81 is not displayed.

It is determined whether a predetermined period of time (such as one minute) has passed since the space management server 3 which has determined that the visitor is not on the member list has transmitted data indicating that the visitor has come. If the determination is affirmative, the space management server 3 transmits in step S22 a message indicating that the admission is denied.

If it is determined in step S16 that the visitor is registered on the member list, or if in step S21 the YES button is pressed on the window as shown in FIG. 7, a message is transmitted to the terminal 1-2 indicating that the admission is permitted. If the visitor is registered on the member list, as described above, the owner allows the visitor to enter the owner's room at any time. Thus, no processing (confirmation of admission) is performed at the owner side. The processing is performed only between the visitor and the space management server 3, thus permitting the visitor to enter the owner's room.

In step S24, the message from the space management server 3 is displayed on the display included in the output unit 17 of the terminal 1-2 at the visitor side. If the message indicating that the admission is denied is received in step S22, for example, the message "Admission is denied" is displayed. If the message indicating that the admission is permitted is transmitted in step S23, for example, the message "Admission is permitted" is displayed, and subsequently the image display section 61 of the display 51 changes its display to display an image of the owner's room.

In the foregoing embodiment, the room list 71 is displayed when the visitor determines a destination. From the room list 71, the visitor selects a room and confirms the selection. A destination can be confirmed in a different manner. For example, it is assumed that the virtual space is a town which contains streets and parks. Along each street, rooms (houses) of owners stand in a row. In such a virtual space, the visitor leaves the visitor's room, walks down the street (moves along the street in the virtual space by operating the avatar), and knocks on the door of a desired room (house), thus confirming a destination.

Thus, images in the virtual space may be rendered as two or three dimensional images.

As the number of owners (members) increases, so does the number of rooms registered on the list. It thus becomes difficult to confirm a destination room by searching the list which contains a large number of rooms for a desired room. Also, it becomes less desirable for a user to search for a destination by walking in the three dimensional or two dimensional virtual space using an avatar since an increase in the number of owners causes the number of rooms to increase, thereby plotting the rooms in a vast area. The user must operate the avatar to walk a long distance to reach a desired owner's room located far apart from the user's room.

In order to solve these problems, the virtual space may be divided into a number of regions. A region is selected by the user, and rooms which belong to the selected region are displayed on the room list 71. From the room list 71, the user searches for a desired room and confirms the desired room. In an embodiment, these problems can also be solved by a user (owner or visitor) who uses the virtual space by making information on recorded or registered rooms (space) known to other users.

Specifically, a room is recorded by a user for some reason such as that the user regards the owner of the room as having a common interest. Thus, a set of rooms recorded by a user is a set or list having a particular characteristic or meaning. In general, such a list is solely used by that user. In an embodiment, the list is also allowed to be used by other users. This enables a user to find a room owned by the owner who has the same interest without searching a list containing many rooms for a desired room or without searching for a desired room in the vast virtual space.

Figure 8:
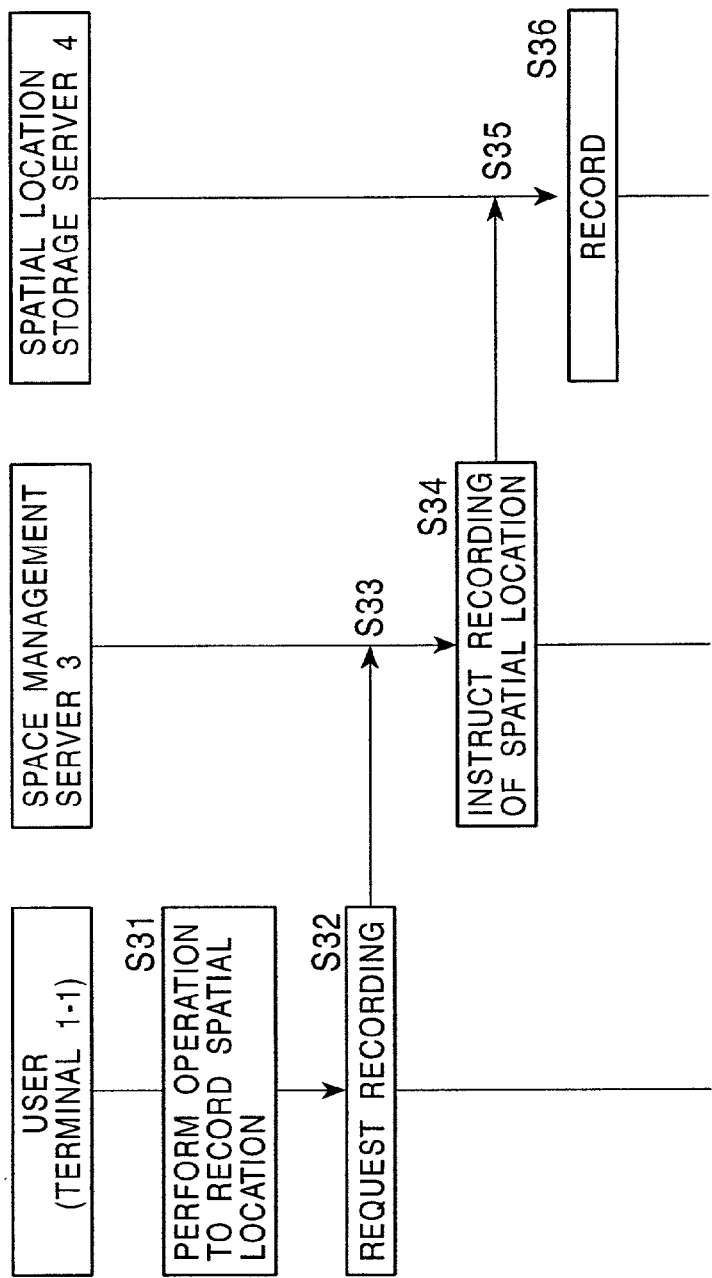
FIG. 8 is a flowchart of the operation of the system shown in FIG. 1 when a spatial location is registered.

Referring to FIG. 8, a process of recording a room by a user is described. It is assumed that the user of the terminal 1-1 records a room or predetermined space in the virtual space (hereinafter referred to as a "spatial location" if necessary). If the user who is in a room owned by another user or predetermined space in the virtual space finds the spatial location favorable or pleasant, the user wants to record that spatial location. In step S31, the user presses the location registration button 67 (FIG. 3).

Figure 9:
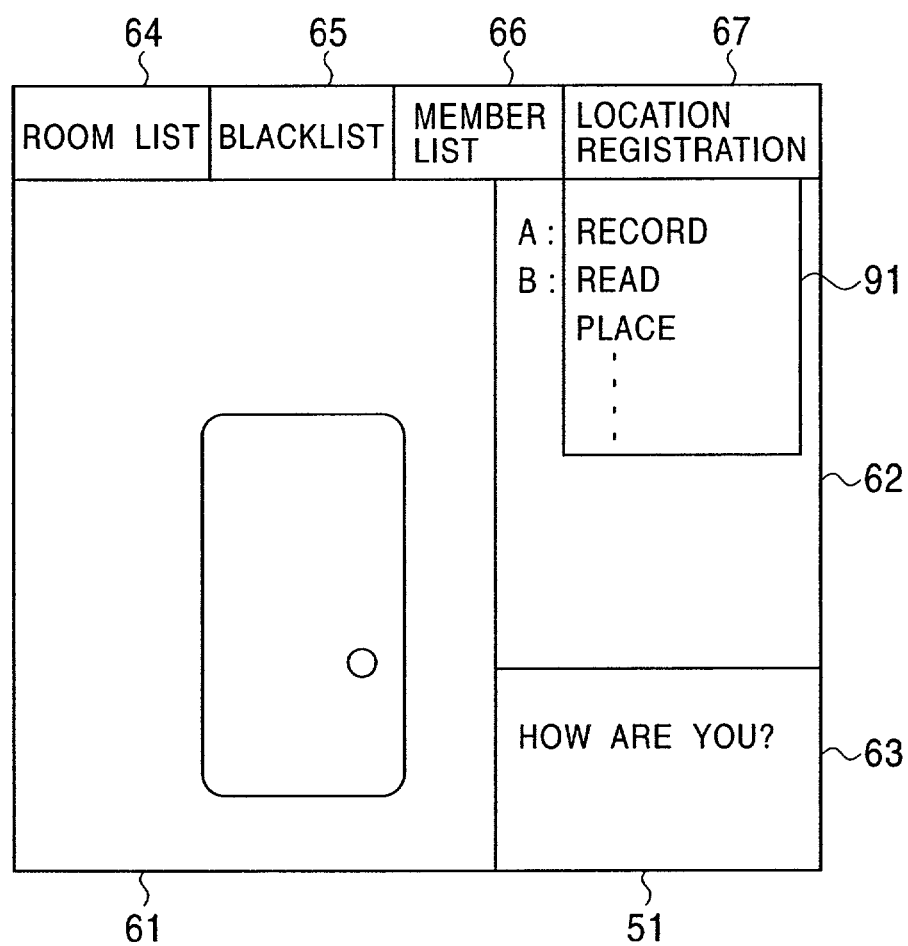
FIG. 9 illustrates another example of a screen displayed on the display.

In response, a menu 91 such as that shown in FIG. 9 displaying the items "record", "read", and "place" is displayed. In step S31, the user selects the item "record" from the menu 91. The user operation is processed in the terminal 1-1. In step S32, the user sends a request requesting the space management server 3 to record the spatial location. The recording request contains an ID for identifying the user (terminal 1-1) and data for identifying the spatial location at which the user's avatar is present when the recording request is issued.

In step S33, the space management server 3 receives the request requesting that the spatial location designated by the terminal 1-1 be recorded. In step S34, the space management server 3 transmits, to the spatial location storage server 4, an instruction instructing the spatial location storage server 4 to record the spatial location together with the ID for identifying the user and the data for identifying the spatial location.

In step S35, the spatial location storage server 4 receives the instruction, ID, and data from the space management server 3. Based on the instruction, the spatial location storage server 4 records the spatial location by adding the designated spatial location to a spatial location list held by the user who corresponds to the ID. Accordingly, a list of favorite spatial locations is created for each user. The created lists are managed by the spatial location storage server 4.

Referring to FIG. 10, a process of reading the spatial location list recorded in this manner is described. In step S41, the user of the terminal 1-1 performs the operation to read the spatial location list. As in recording the spatial location, the operation is performed by pressing the location registration button 67 and selecting the item "read" from the menu 91 (FIG. 9) displayed in response to the previous operation.

In response to the reading instruction, in step S42, the terminal 1-1 transmits a request requesting the space management server 3 to read the spatial location list together with the ID for identifying the user (terminal 1-1). In step S43, the space management server 3 receives the request and the ID from the terminal 1-1.

In response to the request from the terminal 1-1, in step S44, the space management server 3 instructs the spatial location storage server 4 to read the spatial location list which corresponds to the user who has issued the request. In step S45, the spatial location storage server 4 receives the instruction. In step S46, the spatial location storage server 4 reads the designated list from the spatial location database 5 and transmits the list to the space management server 3.

In step S47, the space management server 3 receives the list from the spatial location storage server 4. In step S48, the space management server 3 transfers the received list to the user (terminal 1-1). In step S49, the transferred list is received by the terminal 1-1. The terminal 1-1 displays the received list on the display.

Figure 5:
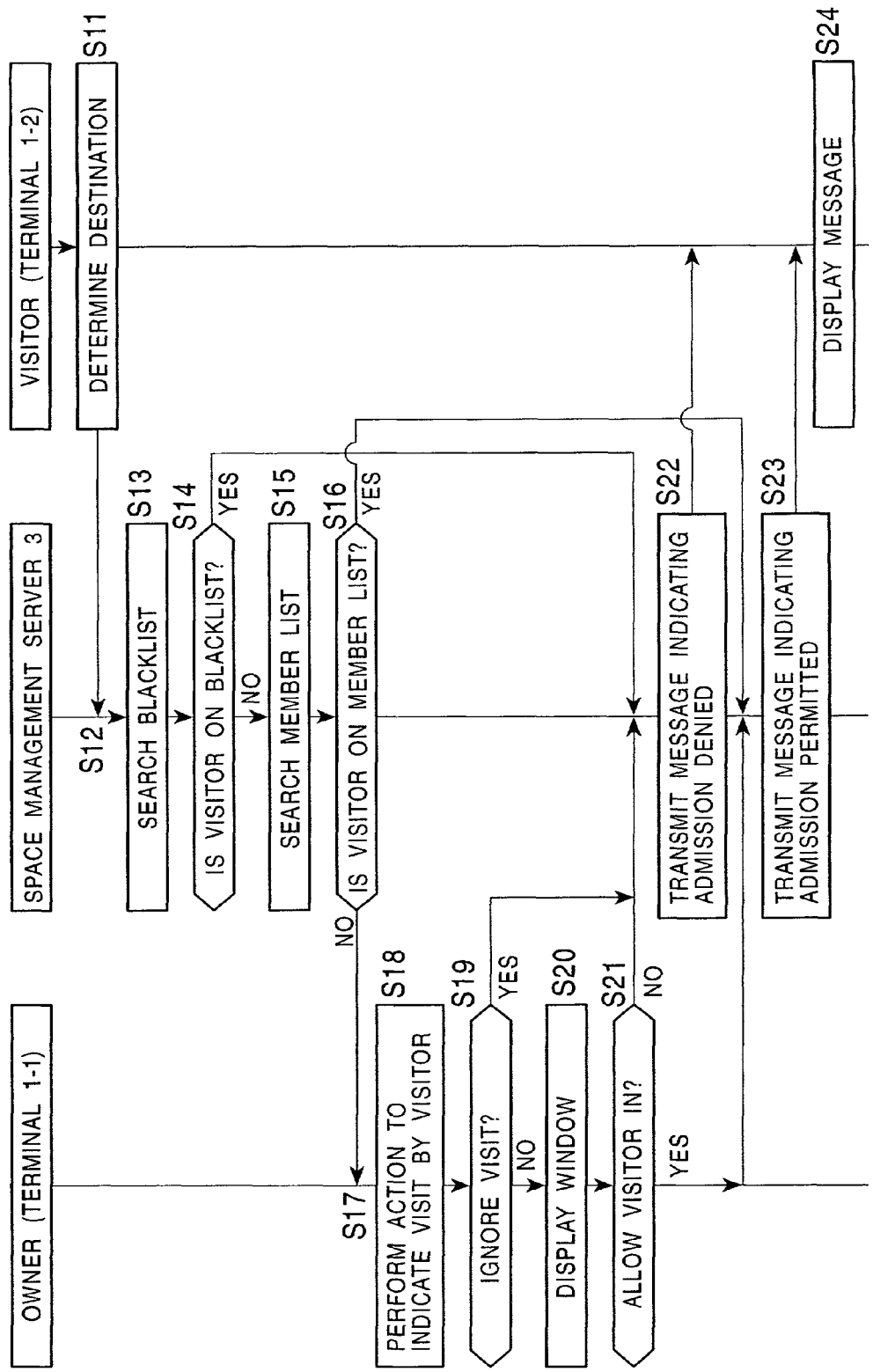
FIG. 5 is a flowchart of the operation of the system shown in FIG. 1 when a visitor makes a visit.

In step S50, the user refers to the displayed list and confirms a desired spatial location as a destination. In step S51, the terminal 1-1 changes the display of the image display section 61 (FIG. 3) to display an image which corresponds to the confirmed spatial location. In response, the avatar moves to the desired spatial location. If the destination spatial location is a room owned by another user, the process of determining whether the user (visitor) is permitted to enter the other user's room, as illustrated with reference to the flowchart in FIG. 5, is performed.

If the screen is changed, thus moving the avatar to the desired spatial location, the terminal 1-1 transmits in step S52 data to the space management server 3 notifying the space management server 3 of the motion of the avatar. In step S53, the space management server 3 receives the data. In step S54, the space management server 3 performs processing in response to the motion of the avatar which is controlled by the terminal 1-1.

Specifically, in step S54, if the avatar under the control of the terminal 1-1 (hereinafter referred to as "avatar A") moves to a destination in which another avatar (hereinafter referred to as "avatar B") is already present, the space management server 3 transmits data instructing a terminal which controls the avatar B to display the avatar A at a predetermined location.

As described above, the user who has created a spatial location list which is recorded for the user can use the spatial location list. Also, other users can be allowed to use the spatial location list. FIG. 11 shows a process of allowing, by a user, other users to use a spatial location list created by the user.

In step S61, if the user of the terminal 1-1 determines that the spatial location list recorded by the user can be made open to other users, the location registration button 67 is pressed, and the item "place" is selected from the displayed menu 91 (FIG. 9). In response, the terminal 1-1 issues a placement request requesting the space management server 3 to place the spatial location list. In step S63, the space management server 3 receives the request. In step S64, the space management server 3 gives an instruction instructing the spatial location storage server 4 to place the spatial location list.

In step S65, the spatial location storage server 4 receives the instruction from the space management server 3 to place the spatial location list. In step S66, the spatial location storage server 4 reads, from the spatial location database 5, the spatial location list which corresponds to the ID assigned to the user of the terminal 1-1 and re-records the read spatial location list as a list which can be used by other users.

In step S64, the space management server 3 gives the instruction instructing the spatial location storage server 4 to place or re-record the spatial location list. At the same time, the space management server 3 gives an instruction instructing the terminal 1-3 to place the spatial location list, that is, to display the spatial location list.

The placement of the spatial location list will now be described. For example, the spatial location list can be placed at predetermined positions in all rooms in the virtual space. This enables many users to use the spatial location list in the most efficient manner.

Alternatively, the spatial location list can be placed at a position in which the user was present when the user issued the placement request. Instead, the spatial location list can be placed in space designated by the user. Accordingly, the spatial location list can be utilized as a place for the user who has given the placement request to exchange information with other users who have the same interest.

Alternatively, the spatial location list can be placed at a predetermined place such as on a street or in a park in the virtual space. Instead, the spatial location list can be placed at random.

From among the above-described placement positions, the user who has given the placement request can select and confirm the placement position. Alternatively, the placement position can be preset by the space management server 3. In any case, if it is determined that the spatial location list is to be placed at a spatial location in which an avatar of the user of the terminal 1-3 is present, the spatial location list is displayed in step S68 on the image display section 61 (FIG. 3) of the display of the terminal 1-3.

The spatial location list can be displayed as an image in any form such as the form of a book or a piece of paper, as long as the user can recognize that the displayed image indicates the spatial location list.

When the spatial location list displayed on the display of the terminal 1-3 is opened by a predetermined operation such as clicking, the process proceeds to step S69. Since the process performed from step S69 onward between the terminal 1-3 and the space management server 3 is similar to that performed from step S50 onward in FIG. 10 between the terminal 1-3 and the space management server 3, a detailed description thereof is omitted.

As described above, each room in the virtual space is owned by and assigned to each user. If the owner of a room is absent, the room can be locked so that other users cannot enter the room without permission, thereby preventing other users from entering the room without permission if the owner of the room is absent.

Preferably, locked rooms are not displayed on the room list 71. However, if locked rooms are displayed on the room list 71, they are displayed so as to be distinguishable from unlocked rooms. If a visitor selects a locked room as a destination, the process illustrated in FIG. 5 is not executed. Thus, the visitor is prevented from entering the locked room.

A key is usually possessed by the owner who uses the key to enter the owner's room. As described above, it is detected that the owner (terminal 1-1) is in the owner's room when the owner establishes a connection with the space management server 3 over the network 2. The room is locked when the owner moves to a room owned by another owner or when the connection with the space management server 3 is terminated. Thus, the owner can possess the key without being concerned about the presence of the key.

Preferably, if the concept of a key is introduced, a user entering a user's room in the virtual space can input a password, instead of using a key, to authenticate the user. Moreover, when the user enters the room, a graphical key can be used to open a graphical door.

The key can be granted to a visitor who is admitted to the owner's room during owner's absence. This allows a room owned by an owner A to be utilized as a place for social interaction among visitors who share the same interest and who have the key even when the owner A is absent. Thus, for example, a movie theater can be provided in the virtual space, and only those who have tickets, which correspond to keys, are admitted to the movie theater.

FIG. 12 shows a process related to the key. In step S81, the owner performs an operation to register the key. When registering the key, the owner sets a password. In step S82, the terminal 1-1 determines that the key registration operation has been performed, associates an ID for identifying the room owned by the owner with the set password, and transmits the ID and password to the space management server 3.

In step S83, the space management server 3 receives a key registration request from the terminal 1-1. In step S84, the space management server 3 registers the key. The space management server 3 associates the received ID for identifying the room with the password and registers the ID and the password in the key database 6.

When the owner wants to grant the key registered in this manner to another user (which in this case is the user of the terminal 1-2), the owner performs key granting process in step S85. The process is performed by designating a grantee of the key. If the grantee of the key is designated, information on the grantee and the ID for identifying the room are transmitted to the space management server 3.

In step S86, the space management server 3 receives the information on the grantee of the key and the ID for identifying the room. In step S87, the space management server 3 reads, from the key database 6, the password which corresponds to the received ID for identifying the room. The space management server 3 transmits the ID and the password as key information to the user designated as the grantee of the key (terminal 1-2). If the terminal 1-2 is connected to the space management server 3, the key information is transmitted at the same time as the password is read. If the terminal 1-2 is not connected to the space management server 3, the key information is subsequently transmitted when the terminal 1-2 establishes a connection with the space management server 3.

In step S88, the terminal 1-2 receives the key information granted by the owner of the terminal 1-1. In step S89, the received key information is registered in the terminal 1-2 in a predetermined format. When the visitor (terminal 1-2) wants to use the registered key, the visitor uses the key in step S90 by performing a predetermined operation. For example, the visitor presses a predetermined button (not shown), for example, a box in which the key is put away, on the image display section 61 (FIG. 3). In response, a list of registered keys is displayed, and the visitor selects a desired key from the list, thus allowing the visitor to use the key.

In step S91, the terminal 1-2 transmits a key using request to the space management server 3. The key using request transmitted to the space management server 3 includes the key information, that is, the ID for identifying the room and the password. In step S92, the space management server 3 receives the key information from the terminal 1-2. In step S93, the space management server 3 searches the key database 6 (FIG. 1) for the received key information, that is, determines whether the received key information is correct.

In step S94, the space management server 3 transmits the search result to the terminal 1-2. If the received key information is detected in the key database 6, data giving the terminal 1-2 admission to the room is transmitted. If the received key information is not detected, data rejecting the admission is transmitted.

Thus, key information is only given to a visitor who is confirmed by the owner as the grantee of the key information. When a visitor who is given key information uses the given key information, it is almost certain that the key information is detected in the key database 6. However, if the owner who has given key information to a visitor changes the password and re-registers the key information in the key database 6, the visitor's key information is associated with the old password, thus rejecting the visitor admission since the visitor's key information cannot be detected in the key database 6.

In step S95, the terminal 1-2 receives the search result from the space management server 3. In step S96, the terminal 1-2 displays information based on the search result. Specifically, if the terminal 1-2 is admitted to the room, the image display section 61 displays the room to which the terminal 1-2 is admitted. If admission is denied, the image display section 61 displays a message indicating that admission is denied.

In an embodiment, there is a mechanism which allows a visitor who enters a room when the owner of the room is absent to leave text data or image data as a gift. The gift left by the visitor in this way can be displayed as a present box, and the owner can click the box to see the inside of the box.

In an embodiment, a visitor who has the key to a room can enter the room using the key. A visitor who does not have the key can enter the room only if the visitor is admitted by the process shown in FIG. 5. Preferably, the key limitation can be expanded to implement a mechanism which refuses admission of a visitor who does not have the key. Thus, only a visitor who has the key can gain access to enter the owner's room. After the visitor has accessed the room, the process shown in FIG. 5 is performed. Thus, the visitor can enter the room only after admitted to the room.

Accordingly, it is possible to provide, in the virtual space, space to which a visitor is not admitted unless the visitor has permission by a user who owns that space. Using the above-described blacklist and member list, it is possible to eliminate predetermined users and to allow predetermined users to enter without permission, thereby lessening the burden on the owner of a room when a visitor visits the room.

As described above, when a visitor visits a room, the owner of the room is notified of the visit in a graphical or audible manner. Thus, even if the owner is busy chatting, this mechanism can make the owner recognize the presence of the visitor without disturbing the chat.

The above-described series of processes can be performed not only by hardware but also by software. When performing these processes using software, a program forming the software is installed from a recording medium in a computer incorporated in dedicated hardware or a general-purpose personal computer which can perform various functions by installing various programs.

Referring to FIG. 2, the recording medium may be formed of packaged media which has recorded therein the program and which is distributed to users, independent of the computer, to provide the program. The packaged media may include the magnetic disk 31 (including a floppy disk), the optical disk 32 (including a CD-ROM (Compact Disk-Read Only Memory) and DVD (Digital Versatile Disk)), the magneto optical disk 33 (including an MD (Mini-Disk)), the semiconductor memory 34, the line and combination thereof. Alternatively, the recording medium may be formed of the ROM 12 having recorded therein the program or the hard disk containing the storage unit 18, which is incorporated beforehand in the computer and then distributed to users.

In an embodiment, steps for writing the program provided by the medium not only include time-series processing performed in accordance with the described order but also include parallel or individual processing, which may not necessarily be performed in time series.

In an embodiment, the system represents an overall apparatus formed of a number of apparatuses.

Although the present invention has been described with reference to specific embodiments, those of skill in the art will recognize that changes may be made thereto without departing from the spirit and scope of the invention as set forth in the hereafter appended claims.

The invention claimed is:

1. An information processing apparatus for managing a virtual space, the information apparatus comprising:
   a processor;
   a memory device storing instructions, which when executed by the processor, cause the processor to:
   (a) maintain the virtual space, wherein the virtual space includes:
      (i) a user space that virtually represents an area owned and occupied by a first user, wherein the first user controls admission of other users to the user space for chat sessions with the first user; and
      (ii) a plurality of spatial locations rendered as three dimensional images, said plurality of spatial locations including:
         (A) a first spatial location rendered as a first three dimensional image; and
         (B) a second spatial location rendered as a second three dimensional image;
   (b) store:
      (i) the user space;
      (ii) the plurality of spatial locations;
      (iii) a list of spatial locations corresponding to the first user, wherein the list of spatial locations lists spatial locations recorded by the first user including the second spatial location; and
      (iv) at least one list of other users associated with a chat session within the user space, wherein said list of other users:
         (A) is generated by the first user; and
         (B) includes:
            (x) at least one other user denied admission to the user space; and
            (y) at least one other user granted admission to the user space;
   (c) place the list of spatial locations at a position in said first spatial location rendered as said first three dimensional image, wherein:
      (i) the position in said first three dimensional spatial location is designated by the first user; and
      (ii) in response to at least one second user selecting said second spatial location from said list of spatial locations which is placed at said position by said first user, a graphical representation of said at least one second user is moved from said first spatial location to said second spatial location;
   (d) notify the first user when a requesting users makes a request for admission to the user space occupied by the first user;
   (e) determine:
      (i) based on the request for admission, whether the requesting user is denied admission to the user space or granted admission to the user space based on the list of users; and
      (ii) based on a time associated with the request for admission, whether the requesting user is denied admission to the user space based on a passing of a predetermined period of time; and
   (f) control admission of the requesting user to the user space based on a response from the first user.

2. The information processing apparatus of claim 1, wherein when executed by the processor, the plurality of instructions cause the processor to provide at least one of a visual and audible notification to the first user.

3. The information processing apparatus of claim 1, wherein when executed by the processor, the plurality of instructions cause the processor to:
   (a) store first entry information generated by the first user to allow other users to enter the user space;
   (b) distribute the first entry information to the requesting user in response to an instruction from the first user; and
   (c) determine whether entry information used by the requesting user to gain access to the user space matches the first entry information when the requesting user uses the distributed first entry information to make a request for admission to the user space; and
   (d) when the determining means determines that the entry information used by the requesting user matches the first entry information:
      (i) terminate the notification; and
      (ii) permit the requesting user admission to the user space.

4. The information processing apparatus of claim 1, wherein the list of spatial locations includes at least one spatial location that virtually represents an area owned by a user other than the first user.

5. An information processing method for managing a virtual space, the information processing method comprising:
   maintaining the virtual space, wherein the virtual space includes:
      (a) a user space that virtually represents an area owned and occupied by a first user, wherein the first user controls admission of other users to the user space for chat sessions with the first user;
      (b) a plurality of spatial locations rendered as three dimensional images, said plurality of spatial locations including:
         (i) a first spatial location rendered as a first three dimensional image; and
         (ii) a second spatial location rendered as a second three dimensional image;
   storing:
      (a) the user space;
      (b) the plurality of spatial locations;
      (c) a list of spatial locations corresponding to the first user, wherein the list of spatial locations lists spatial locations recorded by the first user including the second spatial location; and
      (d) at least one list of users associated with a chat session within the user space, wherein said list of users:
         (i) is generated by the first user; and
         (ii) includes:
            (A) at least one other user denied admission to the user space; and
            (B) at least one other user granted admission to the user space;
   placing the list of spatial locations at a position in said first spatial location rendered as said first three dimensional image, wherein:
      (a) the position in said first three dimensional spatial location is designated by the first user; and (b) in response to at least one second user selecting said second spatial location from said list of spatial locations which is placed at said position by said first user, a graphical representation of said at least one second user is moved from said first spatial location to said second special location;

notifying the first user when a requesting user makes a request for admission to the user space occupied by the first user;

determining, based on the request for admission, whether the requesting user is denied admission to the user space or granted admission to the user space based on the list of users;

determining, based on a time associated with the request for admission, whether the requesting user is denied admission to the user space based on a passing of a predetermined period of time; and controlling admission of the requesting user to the user space based on a response from the first user, the response being based on the determination made by said determining steps.

6. The information processing method of claim 5, wherein the list of spatial locations includes at least one spatial location that virtually represents an area owned by a user other than the first user.

7. A storage medium having stored therein a computer-readable program for causing a computer system to perform processing which enables a plurality of users to communicate with one another in a shared virtual space formed and provided on a computer network, the program comprising the steps of:

maintaining the virtual space, wherein the virtual space includes:
  (a) a user space that virtually represent areas owned and occupied by a first user, wherein the first user controls admission of other users to the user space for chat sessions with the first user;
  (b) a plurality of spatial locations rendered as three dimensional images, said plurality of spatial locations including:
    (i) a first spatial location rendered as a first three dimensional image; and
    (ii) a second spatial location rendered as a second three dimensional image; and storing:
  (a) the user space;
  (b) the plurality of spatial locations;
  (c) a list of spatial locations corresponding to the first user, wherein the list of spatial locations lists spatial locations recorded by the first user including the second spatial location; and
  (d) at least one list of users associated with a chat session within the user space, wherein said list of users:
    (i) is generated by the first user; and
    (ii) includes:
      (A) at least one other user denied admission to the user space; and
      (B) at least one other user granted admission to the user space;

placing the list of spatial locations at a position in said first spatial location rendered as said first three dimensional image, wherein:
  (a) the position in said first three dimensional spatial location is designated by the first user; and
  (b) in response to at least one second user selecting said second spatial location from said list of spatial locations which is placed at said position by said first user, a graphical representation of said at least one second user is moved from said first spatial location to said second special location;

notifying the first user when a requesting user makes a request for admission to the user space occupied by the first user;

determining, based on the request for admission, whether the requesting user is denied admission to the user space or granted admission to the user space based on the list of users;

determining, based on a time associated with the request for admission, whether the requesting user is denied admission to the user space based on a passing of a predetermined period of time; and controlling admission of the requesting user to the user space based on the determination made in the determining steps.

8. The storage medium of claim 7, wherein the list of spatial locations includes at least one spatial location that virtually represents an area owned by a user other than the first user.

9. A program for causing a computer to perform the steps of:

maintaining a virtual space, wherein the virtual space includes:
  (a) a user space that virtually represents an area owned and occupied by a first user, wherein the first user controls admission of other users to the user space for chat sessions with the first user;
  (b) a plurality of spatial locations rendered as three dimensional images, said plurality of spatial locations including;
    (i) a first spatial location rendered as a first three dimensional image; and
    (ii) a second spatial location rendered as a second three dimensional image; and storing:
  (a) the user space;
  (b) the plurality of spatial locations;
  (c) a list of spatial locations corresponding to the first user, wherein the list of spatial locations lists spatial locations recorded by the first user including the second spatial location; and
  (d) at least one list of users associated with a chat session within the user space, wherein said list of users:
    (i) is generated by the first user; and
    (ii) includes:
      (A) at least one other user denied admission to the user space; and
      (B) at least one other user granted admission to the user space;

placing the list of spatial locations at a position in said first spatial location rendered as said first three dimensional image, wherein;
  (a) the position in said first three dimensional spatial location is designated by the first user; and
  (b) in response to at least one second user selecting said second spatial location from said list of spatial locations which is placed at said position by said first user, a graphical representation of said at least one second user is moved from said first spatial location to said second special location;

notifying a first user when a requesting user makes a request for admission to the user space occupied by the first user;

determining, based on the request for admission, whether the requesting user is denied admission to the user space or granted admission to the user space based on the list of users stored in said storage means;

determining, based on a time associated with the request for admission, whether the requesting user is denied admission to the user space based on a passing of a predetermined period of time; and controlling admission of the requesting user to the virtual space based on the determination made in the determining steps.

10. The program of claim 9, the program causing the computer to perform the further steps of:

storing a list of users designated by the first user as those denied admission to the virtual space;

determining whether the requesting user is on the list when the requesting user makes the request for admission to the virtual space; and terminating the notification and denying the requesting user admission to the virtual space when it is determined that the requesting user is on the list.

11. The program of claim 9, the program causing the computer to perform the further steps of:

storing a list of users designated by the first user as those permitted admission to the virtual space;

determining whether the requesting user is on the list when the requesting user makes the request for admission to the virtual space; and terminaating the notification and permitting the requesting user admission to the virtual space when it is determined that the requesting user is on the list.

12. The program of claim 9, the program causing the computer to perform the further steps of:

storing first entry information generated by the first user to allow other users to enter the virtual space;

distributing the stored first entry information to the requesting user in response to an instruction from the first user;

determining whether entry information used by the requesting user to gain access to the virtual space matches the stored first entry information when the requesting user uses the distributed first entry information to make a request for admission to the virtual space; and terminating the notification and permitting the requesting user admission to the virtual space when it is determined in the determining step that the entry information used by the requesting user matches the stored first entry information.

13. The program of claim 9, the program causing the computer to perform the further steps of:

storing a list of predetermined spatial locations in the virtual space, the spatial locations, being designated by the first user; and placing the stored list in predetermined space in the virtual space in response to an instruction from the first user.

14. The program of claim 9, wherein the list of spatial locations includes at least one spatial location that virtually represents an area owned by a user other than the first user.

* * * * *